United States Patent [19]

Zukausky

[11] 4,285,499
[45] Aug. 25, 1981

[54] CAM ACTUATED BUTTERFLY VALVE

[75] Inventor: Keith E. Zukausky, St. Charles, Ill.

[73] Assignee: Eaton Corporation, Cleveland, Ohio

[21] Appl. No.: 17,518

[22] Filed: Mar. 5, 1979

[51] Int. Cl.³ .......................................... F16K 31/524
[52] U.S. Cl. .................................. 251/229; 251/251;
251/294; 251/368; 74/25; 74/57
[58] Field of Search ...................... 74/57, 25; 251/251,
251/252, 286, 294, 229, 58, 368, 305

[56] References Cited
U.S. PATENT DOCUMENTS

| | | | |
|---|---|---|---|
| 1,336,847 | 4/1920 | Lewis | 74/25 |
| 1,759,060 | 5/1930 | Moore | 251/252 |
| 2,737,825 | 3/1956 | Plockelman | 251/294 |
| 2,751,186 | 6/1956 | Glur | 251/294 |
| 2,953,344 | 9/1960 | Yancey | 251/252 |
| 3,184,214 | 5/1965 | King | 251/252 |
| 3,737,142 | 6/1973 | Boswell et al. | 251/58 |
| 3,818,770 | 6/1974 | Sievers | 74/57 |
| 3,985,151 | 10/1976 | Smith | 251/58 |

Primary Examiner—Martin P. Schwadron
Assistant Examiner—G. L. Walton
Attorney, Agent, or Firm—R. J. McCloskey; E. C. Crist; R. A. Johnston

[57] ABSTRACT

A cam actuated valve (10) is disclosed having a butterfly-type valve member (52) rotatably mounted to a crank member (40) extending into a fluid passageway (23) defined by the valve housing. A rectangular bracket (12) attached to one side of the valve housing has parallel edges (66, 68) forming guide surfaces which are slidably received in parallel grooves (62, 64) molded into an actuator member (14). The outer end of the crank member extends through an elongated slot formed in the actuator member thereby defining a cam-cam follower arrangement which transfers the linear movement of the actuator member to rotation of the crank member. The configuration of the cam slot and its position relative to crank member follower end provides a mechanical advantage enabling a relatively low input force exerted on the actuator member to operate the valve.

11 Claims, 3 Drawing Figures

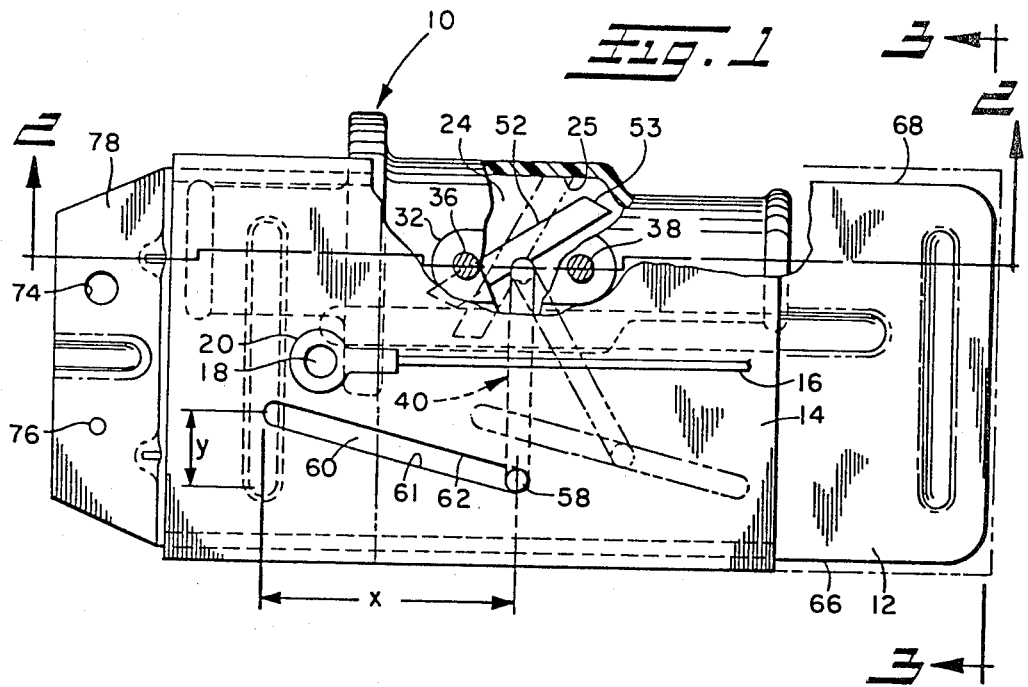
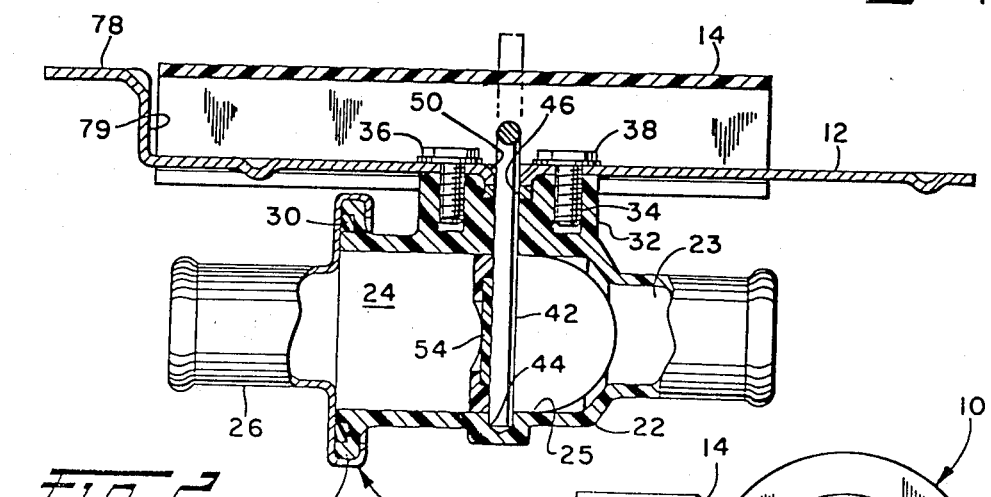
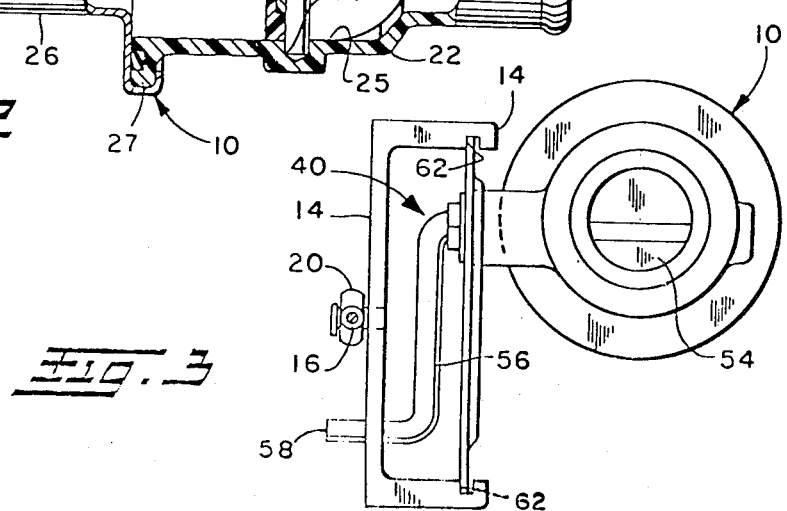

CAM ACTUATED BUTTERFLY VALVE

BACKGROUND OF THE INVENTION

This invention relates to fluid valves for use in automotive heating and cooling systems.

DESCRIPTION OF THE PRIOR ART

Known water valves presently in use in automotive vehicle heating and air conditioning systems include spool valves and diaphragm valves. A problem associated with the operation of diaphragm water valves is that if the diaphragm fails, the coolant can quickly escape to the atmosphere resulting in immediate disabling of the vehicle cooling system.

A problem associated with known spool valves is their inherent sensitivity to any debris which might be in the cooling system working fluid. A frequent source of contamination in automotive cooling systems can be traced to a small amount of casting sand which remains on engine block surfaces even after a cleaning operation. The casting sand remaining on the surface of the cooling system passageways in the engine block can become loosened and circulate through the cooling system. The sand will then become trapped around an area adjacent the valve spool or poppet and its seating face, thereby inevitably resulting in breakdown of the spool valve O-ring seals and valve leakage.

Prior art valves incorporating butterfly type movable valve members have heretofore been found unacceptable due to the difficulty encountered in attempting to modulate the valve output flow rate. Butterfly type valves are inherently sensitive and need not move through more than approximately 20 degrees of angular displacement from a closed position to achieve a nearly maximum fluid flow rate. Actuation of the valve member by means of the well known Bowden wire type arrangement has failed to provide the necessary sensitivity and positional stability. Bowden wire type actuation has very limited sensitivity due in part to the small amount of movement required for valve actuation, and also due to the fluid forces acting on the butterfly valve member which are often sufficient to override the frictional forces of the Bowden actuation wire in its sheath resulting in shifting of the valve position. This problem is particularly severe at lower flow rate settings where the viscous forces developed across the leading or upstream edges of the butterfly valve member are highest.

SUMMARY OF THE INVENTION

The valve of the present invention incorporates a butterfly valve member mounted for rotation on a portion of a crank member which extends into the valve housing and is in sealing engagement therewith. An L-shaped end of the crank member extends through a rectangular mounting bracket which is connected to one side of the valve housing. The bracket has parallel edges which function as guide surfaces. An actuator member formed of a glass filled nylon material is slidably received over the guide surfaces of the bracket and is adapted for connection to a force transmitting Bowden wire. The actuator member has a cam surface defined by a slot molded into one face thereof. The end portion of the crank member is received in the slot and functions as a cam follower for providing movement of the valve member.

The configuration of the cam slot can be varied to achieve a desired mechanical advantage and angular displacement of the crank to suit the available linear actuation force available through the Bowden wire. By decreasing the slope of the cam slot with respect to the direction of motion of the actuator, the distance the actuator member slides along the bracket to achieve a given amount of valve movement is also increased, thereby substantially increasing the sensitivity of adjustment of valve operation.

The shape of the cam profile can also be varied to achieve a desired valve flow rate for a given amount of cam actuator member linear movement.

Abutment of the crank against one end of the slot defines a closed position and prevents the actuator member from detachment from the mounting bracket. Movement of the actuator member in the opposite direction is limited by abutment against a right angle bend in the bracket which defines a fully open valve position.

The flexibility of the actuator member enables it to be snapped into position on the bracket with the crank extending through the cam slot, thus greatly simplifying assembly and reducing component complexity.

Another unique feature of the present invention is that the valve tends to be self cleaning and insensitive to debris and contamination that may be present in the vehicle cooling system.

Another feature of the invention found particularly desirable is its direct mechanical actuation arrangement which permits positive valve operation.

Yet another feature of the invention is its relatively high reliability with a minimal number of component parts.

The valve of the present invention is also less sensitive to seal failure due to the relatively low "seal to atmosphere" interface characteristic of butterfly valves. Seal failure will, generally, occur at a relatively low flow rate enabling detection of the leak well before the critical loss of the engine coolant.

The mechanical advantage available with the cam acruation arrangement of the present valve offers the benefit of a low magnitude shut-off force which permits ease of operation in manual systems and minimizes the size and cost of the power source for driving the Bowden wire in automatic systems.

Another feature of the invention is that the cam profile can be selectively altered to achieve any flow rate for a given position of the actuator member.

The present invention is less costly than comparable poppet or spool valves providing the same sensitivity.

BRIEF DESCRIPTION OF THE DRAWINGS

FIG. 1 is a side elevational view of the invention with portions thereof broken away;

FIG. 2 is a cross-sectional view of the invention taken along section lines 2—2 of FIG. 1;

FIG. 3 is an end view taken along section indicating lines 3—3 of FIG. 1.

DETAILED DESCRIPTION

Referring now to FIGS. 1 and 2, there is indicated generally by reference numeral 10 a rotary acting butterfly valve assembly, a bracket 12, an actuator member 14, and a Bowden type actuating wire 16 connected to a post 18 extending from and preferably molded integrally into actuator member 14. Bowden wire 16 is connected to post 18 by any convenient expedient as, for example, by an eyelet 20 as shown in FIG. 1.

Butterfly valve assembly 10 includes a housing 22 formed of a desired material and preferably molded from a suitable polymeric material. A fluid passageway 23 and a valve chamber 24 are defined by housing 22. The internal wall surface 25 of valve chamber 24 functions as a valve seating surface. A housing extension 26, preferably metallic, is crimped over a flanged portion 27 of housing 22 and sealed thereto by an annular seal ring 28 mounted in a groove 30 molded into the face of flanged portion 27.

A boss 32 projects from one side of housing 22 and provides a flat mounting surface 34 for bracket 12 which is secured thereby by screws 36 and 38. A crank member, indicated generally by reference numeral 40, includes a first section 42 extending through the wall valve chamber 24. The lower end of section 42 is seated in a blind cross-hole 44 in the wall of chamber 24 in the housing 22. A seal ring 46 is mounted in a counterbore 48 formed in housing 22 and prevents fluid leakage from the valve chamber. Seal ring 46 is retained in counterbore 48 by a suitable expedient and preferably by a crimped portion 50 in bracket 12. A valve member 52, formed of rubber or any other suitable material compatible with the fluids employed in heating and cooling systems has a peripheral valve surface 53 and is molded around a metallic plate 54, shown only in cross section in FIG. 2, and is attached, preferably to section 42 of the crank member 40 for rotation therewith.

Referring to FIG. 3, crank member 40 includes a second section 56 which extends exteriorly of chamber 24 of housing 22 and terminates in a cam follower portion 58.

As shown in FIG. 1, actuator member 14 has a slot 60 provided therein with generally parallel sides and defining cam surfaces 61 and 62. Cam follower portion 58 extends through slot 60 and is engageable with cam surfaces 61 and 62.

Referring to FIG. 3, actuator member 14 has a channel shaped transverse cross-sectional shape with grooves 62 and 64 formed adjacent the ends of the channel legs. Parallel edges 66 and 68 of bracket 12 are received in grooves 62 and 64 and form guide surfaces which enable actuator member 14 to slide freely therealong with minimal transverse movement.

Bracket 12 has ribs 70 and gussets 72 are formed therein for increasing its rigidity, while holes 74 and 76 are provided into a right angle portion 78 for mounting the device. Portion 78 has the right hand face of the vertical leg extending perpendicularly from bracket 12 and functions as an abutment or stop surface for limiting movement of actuator member 14 leftward relative to FIG. 1.

The length of valve member 52 in a direction perpendicular to crank section 42 exceeds the internal diameter of valve chamber 24. By sizing valve member 52 in this manner, the amount of angular displacement required to move the valve member to a substantially open position is considerably less than 90 degrees and therefore shortens the amount of angular displacement through which crank 40 must rotate to achieve valve opening and closing. This arrangement enables the valve member to compensate for wear and eliminates the requirement for precise and close fitting tolerances between valve surface 53 and its associated valve seat defined by surface 25.

In the presently preferred practice of the invention actuator member 14 is formed of a glass filled nylon. As illustrated by FIG. 3, the thickness of the vertical portion of the actuator member is relatively thin, approximately 0.06 inch (1.52 mm), compared to its length, about 1.50 inch (38 mm) thereby making it resiliently deflectable. The deformable nature of member 14 enables it to be assembled to bracket 12 by aligning and inserting cam follower section 58 into slot 60 and then sliding either guide surface 66 or 68 into its respective groove. The remaining groove is fitted over its respective guide surface by applying a downward force to the vertical face of actuator member 14 sufficient to deflect the mid-section of the channel shaped cross-sectional configuration until the groove snaps over its corresponding guide surface. Actuator member 14 is then captured to the crank 58 and bracket 12 without the need for special fasteners or assembly fixturing. The presently preferred actuator member 14 is thickened in the area around grooves 62 and 64 to provide rigidity.

In operation, Bowden wire 16 is moved leftward relative to FIG. 1 until the left hand end of actuator member 14 abuts against surface 79 of bracket 12, thereby aligning the arm of crank member 40 vertically in the position shown in dashed outline by FIG. 1 and in which valve member 52 is in an open position as shown in solid outline in FIG. 1, also designated as a second position.

Movement of Bowden wire 16 to the right relative to FIG. 1 causes actuator member 14 to slide to the right during which movement cam surface 61 exerts a force on follower 58 moving it rightward and rotating crank section 42 in a counterclockwise direction. The length and slope of groove 60 relative to crank position and actuator member movement are established to provide a mechanical advantage whereby the force necessary to move the actuator member is substantially reduced in order to overcome the resisting torque on the crank member from forces associated with fluid flow.

As the actuator member 14 is moved to the right by Bowden wire 16, cam surface 61 exerts a force on cam follower 58 which tends to rotate crank member 40 in a counterclockwise direction moving the valve member 52 toward the closed position, shown in dashed outline in FIG. 1. Actuator member 14 can be moved to the right relative to FIG. 1, until follower portion 58 abuts the left end of slot 60, as shown by the dashed lines. In this position further actuator member movement is prevented and valve member 52 is in the closed or second position. The mechanical advantage of the cam arrangement in the second position is at its maximum and is a function of the crank angle relative to the slot angle as will be apparent to those skilled in the art.

By changing the configuration of cam profile the total length of travel of actuator member 14 can be varied to suit the available magnitude and stroke of the actuating source. In addition, the cam profile can be changed to provide a valve fluid flow rate versus actuator member position depending upon the requirements of the particular application.

It will be understood to those having ordinary skill in the art that modifications and variations of the invention may be made without departing from the scope of the invention which is more particularly described in the following claims.

What is claimed is:

1. A fluid valve assembly for modulating fluid flow therethrough actuated by a linear input means, said valve assembly comprising:
   (a) housing means defining a fluid flow passage therethrough and a valve seat within said fluid flow passage, said housing means including structure defining at least one exterior guide surface;

(b) a butterfly valve member rotatably mounted to said housing means, said valve member being movable between a closed position engaging said valve seat and an open position spaced from said valve seat;

(c) crank means having a first portion connected to said butterfly valve member for providing said rotary movement, a second portion extending exteriorly of said housing means, said second portion including a cam follower portion;

(d) actuator means slidably received on said exterior guide surfaces and movable linearly relative to said housing means between a first and second position in response to actuation by said linear input means, said actuator means defining a cam surface engageable with said cam follower portion, said crank means rotatable in response to movement of said actuator means such that in said first position said valve member is closed and in said second position said valve member is open, said cam surface being aligned relative to the direction of motion of said actuator means such that while said actuator means is in or near said first position, a given movement of said actuator means produces lesser movement of said cam follower portion relative to said housing means.

2. A valve as defined in claim 1 wherein, said structure defining said exterior guide surfaces guide surfaces includes spaced parallel surface portions.

3. A valve as defined in claim 1 wherein, said actuator means comprises a resiliently deformable member having a channel shaped cross-section with each leg of said channel contacting said guide surfaces.

4. A valve assembly as defined in claim 1 wherein, said actuator means comprises a resilient member having a channel shaped cross-section with a longitudinally extending groove formed in each leg thereof with one of said guide surfaces received and slidably guided in each groove.

5. A valve as defined by claim 1, wherein said actuator means is formed of a resiliently deformable glass filled polymer.

6. A valve as defined in claim 1, wherein said cam surface is substantially straight.

7. A device as defined in claim 1, wherein said housing means includes abutment means for limiting movement of said actuator means beyond said open position.

8. A device as defined in claim 1, wherein cam surface includes a stop surface, said actuator means is prevented from disengagement with said cam follower portion by abutment against said stop surface.

9. The device as defined in claim 1, further including a Bowden wire connected to said actuator means.

10. A fluid valve assembly for modulating fluid flow therethrough actuated by a linear input means, said valve assembly comprising:

(a) housing means defining a fluid flow passage therethrough and a valve seat within said fluid flow passage, said housing means including means defining a plurality of guide surfaces;

(b) a movable valve member rotatably mounted to said housing means, said valve member being movable between a closed position engaging said valve seat and an open position spaced from said valve seat;

(c) crank means having a first portion connected to said valve member for providing said rotary movement, a second portion extending exteriorly of said housing means, said second portion including a cam follower portion;

(d) actuator means slidably received on said guide surfaces and movable linearly relative to said housing means between a first and second position in response to actuation by said linear input means, said actuator means including a resiliently deformable member having a channel shaped cross-section with each of said guide surfaces slidably contacting a leg of said channel, said actuator means defining a cam surface engageable with said cam follower portion, said crank means moving in response to movement of said actuator means such that in said first position said valve member is closed and in said second position said valve member is open.

11. A fluid valve assembly for modulating fluid flow therethrough actuated by a linear input means, said valve assembly comprising:

(a) housing means defining a fluid flow passage therethrough and a valve seat within said fluid flow passage, said housing means including means defining a plurality of guide surfaces;

(b) a movable valve member rotatably mounted to said housing means, said valve member being movable between a closed position engaging said valve seat and an open position spaced from said valve seat;

(c) crank means having a first portion connected to said valve member for providing said rotary movement, a second portion extending exteriorly of said housing means, said second portion including a cam follower portion;

(d) actuator means slidably received on said guide surfaces and movable linearly relative to said housing means between a first and second position in response to actuation by said linear input means, said actuator means includes a resilient member having a channel shaped cross-section with a longitudinally extending groove formed in each leg thereof with one of said guide surfaces received and slidably guided in each groove, said actuator means defining a cam surface engageable with said cam follower portion, said crank means moving in response to movement of said actuator means such that in said first position said valve member is closed and in said second position said valve member is open.

* * * * *